United States Patent
Saida et al.

(10) Patent No.: US 7,794,010 B2
(45) Date of Patent: Sep. 14, 2010

(54) DOOR TRIM

(75) Inventors: Yasuo Saida, Kariya (JP); Junichi Kawakami, Kariya (JP); Takuma Hiruta, Kariya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 35 days.

(21) Appl. No.: 12/332,470

(22) Filed: Dec. 11, 2008

(65) Prior Publication Data

US 2009/0179454 A1 Jul. 16, 2009

(30) Foreign Application Priority Data

Jan. 10, 2008 (JP) ............... 2008-003621

(51) Int. Cl.
*B60N 2/46* (2006.01)

(52) U.S. Cl. ................... 296/153; 296/187.12

(58) Field of Classification Search ........... 296/153, 296/187.12; 297/411.2, 411.21
See application file for complete search history.

(56) References Cited

U.S. PATENT DOCUMENTS

| | | | |
|---|---|---|---|
| 4,783,114 A | 11/1988 | Welch | |
| 4,919,470 A | 4/1990 | Müller | |
| 5,433,478 A | 7/1995 | Naruse | |
| 5,445,430 A * | 8/1995 | Nichols | 296/153 |
| 5,527,084 A * | 6/1996 | Scherf | 296/153 |
| 5,549,327 A | 8/1996 | Rüsche et al. | |
| 6,893,077 B1 * | 5/2005 | DeJongh | 296/187.05 |
| 7,291,378 B2 | 11/2007 | Cowelchuk et al. | |

| | | | |
|---|---|---|---|
| 2009/0146480 A1 * | 6/2009 | Knowlden | 297/411.2 |

FOREIGN PATENT DOCUMENTS

| | | |
|---|---|---|
| DE | 8018925 | 10/1980 |
| DE | 3740938 | 6/1989 |
| DE | 4038659 | 6/1991 |
| DE | 4140706 | 6/1993 |
| DE | 3887088 | 4/1994 |

(Continued)

OTHER PUBLICATIONS

English language Abstract and translation of JP 2007-083899 A.

(Continued)

*Primary Examiner*—Dennis H Pedder
(74) *Attorney, Agent, or Firm*—Greenblum & Bernstein, P.L.C.

(57) ABSTRACT

A door trim having rigidity as an armrest while is easily deformed in an event of side impact to a vehicle and thereby reduces impact to a person located in a compartment of the vehicle, can be provided with the present invention.

The door trim 1 for use with the vehicle includes a body 10 and an armrest 20 that protrudes from the body 10. The armrest 20 includes resin foam molding. The armrest 20 is thinner than the body 10. The door trim 1 also includes a plurality of ribs 23 disposed on an inner surface of the armrest 20. The armrest 20 is pushed against the person to be deformed in the event of side impact to the vehicle, thereby reducing impact to the person. A position of a break line 21 is set by the plurality of ribs 23 arranged in a front-back direction of the vehicle.

3 Claims, 7 Drawing Sheets

FOREIGN PATENT DOCUMENTS

| | | |
|---|---|---|
| DE | 4417835 | 11/1995 |
| DE | 10064680 | 8/2002 |
| GB | 2238989 | 6/1991 |
| JP | 10-016685 A | 1/1998 |
| JP | 2007-083899 A | 4/2007 |

OTHER PUBLICATIONS

English language Abstract and translation of JP 10-016685 A.

* cited by examiner

DOOR TRIM

CROSS REFERENCE TO RELATED APPLICATION

This application claims priority from Japanese Patent Application No. 2008-003621 filed Jan. 10, 2008. The entire content of this priority application is incorporated herein by reference.

TECHNICAL FIELD

The present invention relates to a door trim for use with a vehicle. In an event of side impact to the vehicle, an armrest of the door trim is pushed against a person located in a compartment of the vehicle and thereby is deformed, which results in reducing impact to the person.

BACKGROUND OF THE INVENTION

One of door trims for use with a vehicle is disclosed in Japanese Unexamined Patent Application Publication No. 2007-83899. In the art, the door trim has an armrest that protrudes from a wall of the door trim toward an inside of a compartment of the vehicle. The armrest is integrally formed with the door trim. The armrest has a grooved thin portion in an inner surface thereof. In the event of side impact to the vehicle, the armrest is pushed against a person located in the compartment. The armrest is then deformed along the thin portion and in a direction from an outer surface thereof toward the inside of the vehicle compartment. As the result of this deformation, impact to the person located in the vehicle compartment is reduced.

There are various materials that are used to form the door trims. For example, there is a case where resin foam molding is used to form the door trim. However, where molding resin foam is used to form the armrest having the grooved thin portion, the resin foam tends to shrink more easily in the grooved thin portion than in the portions around the grooved thin portion. Because of this shrink, sink marks are easily generated in the armrest. Therefore, in order to prevent generation of the sink marks, it is considered to form the entire armrest thinly and without forming the grooved thin portion.

SUMMARY OF THE INVENTION

However, where the entire armrest is thinly formed, when the person rests the elbow on the armrest, the armrest is easily deformed by the weight of the elbow. This is a problem. But then again, the armrest needs to be easily deformed in the event of side impact to the vehicle. Therefore, the armrest is still preferable to be formed as thin as possible.

One of purposes of the present invention is to provide a door trim having an armrest that has an ensured rigidity for use as the armrest while can reduce impact to a person located in a compartment in an event of side impact to the vehicle.

One aspect of the present invention is a door trim for use with a vehicle. The vehicle includes a compartment and a door panel. The door panel has a wall on the vehicle compartment side thereof. The door trim reduces impact to a person located in the compartment in an event of side impact to the vehicle. The door trim includes a body configured to be mounted along the wall of the door panel of the vehicle and an armrest that protrudes from the body toward the inside of the vehicle compartment. The armrest includes resin foam molding. The armrest is thinner than the body. The armrest has an outer surface and an inner surface. The door trim also includes a plurality of ribs disposed on the inner surface of the armrest. The door trim also includes a break line set substantially in a center of the armrest in a transverse direction of the vehicle. The break line extends substantially in the front-back direction of the vehicle. The armrest is pushed against the person to be deformed substantially along the break line and in a direction from the outer surface of the armrest toward the inside of the vehicle compartment in the event of side impact to the vehicle. The plurality of ribs are arranged in a front-back direction of the vehicle and thereby set a position of the break line.

With this aspect of the invention, in the event of impact to the vehicle, the armrest is deformed along the break line and in a direction from an outer surface of the armrest toward the inside of the vehicle compartment. This deformation of the armrest can reduce impact to the person. Furthermore, the plurality of ribs arranged on the armrest ensure the rigidity of the armrest to bear a weight of the elbow. Therefore, when the person rests the elbow on the outer surface of the armrest, the outer surface of the armrest can be prevented from sinking toward the inner surface side.

Other aspect of the present invention are preferably as follows.

The inner surface of the armrest includes a nearer area and a farther area. The nearer area is nearer to the person than the farther area. The plurality of ribs are arranged in the nearer area and in the farther area.

With this aspect of the invention, the position of the break line can be set between the rib arranged in the area nearer to the person and the rib arranged in the area far from the person.

The ribs arranged in the nearer area and the ribs arranged in the farther area are arranged in a manner out of line with each other in the transverse direction of the vehicle.

With this aspect of the invention, the plurality of ribs can be arranged on the inner surface of the armrest in a better balance and, therefore, the rigidity of the armrest can be increased.

In accordance with the present invention, the door trim having the armrest that includes resin foam molding can be provided. While the armrest has the rigidity as the armrest, the armrest can be easily deformed in the event of side impact to the vehicle so that impact to the person is reduced.

DETAILED DESCRIPTION

First Embodiment

Figure 1:
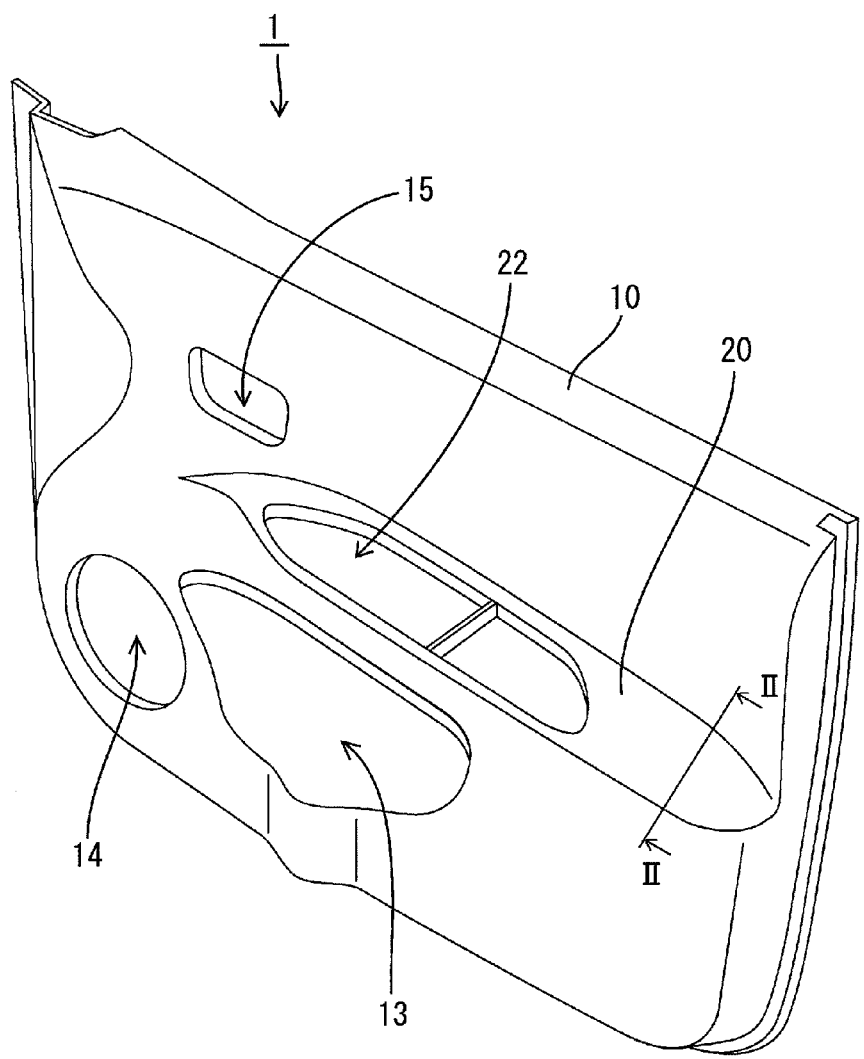
FIG. 1 is a perspective view of a door trim of a first embodiment.

A first embodiment in accordance with the present invention will be described with reference to FIGS. 1 through 5. A door trim 1 of this embodiment is configured to be mounted to a right front door (not illustrated) of a vehicle as shown in FIG. 1. The door trim 1 includes a body 10.

Figure 5:
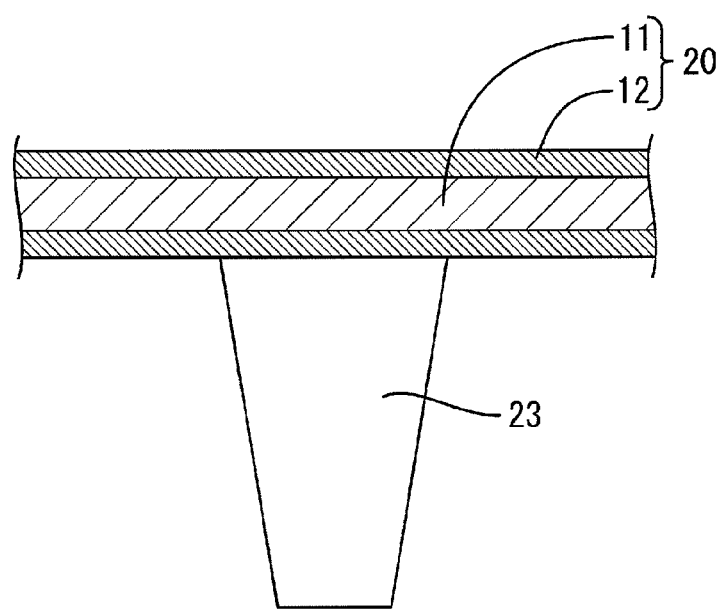
FIG. 5 is a side view showing a state where ribs are secured to an inner surface of the armrest in the first embodiment.

As shown in FIG. 5, the body 10 includes a foam layer 11 and skin layers 12. A door panel (not illustrated) has a wall on the vehicle compartment side thereof, and the body 10 is mounted along the wall of the door panel. The door panel is one of exterior parts of the vehicle door. A wall of the body 10 faces the inside of a compartment of the vehicle, and the wall of the body 10 is provided with an armrest 20.

The foam layer 11 is configured by resin foam molding. Surfaces of the foam layer 11 are covered with the skin layers 12.

The armrest 20 has a shape protruding from the body 10 toward the inside of the vehicle compartment. The armrest 20 is thinner than the body 10. The armrest 20 is integrally formed with the body 10. The armrest 20 has a flat outer surface. The outer surface of the armrest 20 is provided with a switch pocket 22 in a front portion thereof. The body 10 is provided with a door pocket 13 in a lower portion of the armrest 20.

The switch pocket 22 allows switch equipments of power windows and the like to be accommodated therein. The switch pocket 22 penetrates the outer surface of the armrest 20.

The door pocket 13 has an upward opening. The body 10 has a hole 14 in front of the door pocket 13. The hole 14 allows a speaker (not illustrated) to be installed therein.

In addition, the body 10 also has a hole 15 near a front end of the armrest 20. The hole 15 allows an inside handle (not illustrated) to be mounted therein.

Figure 2:
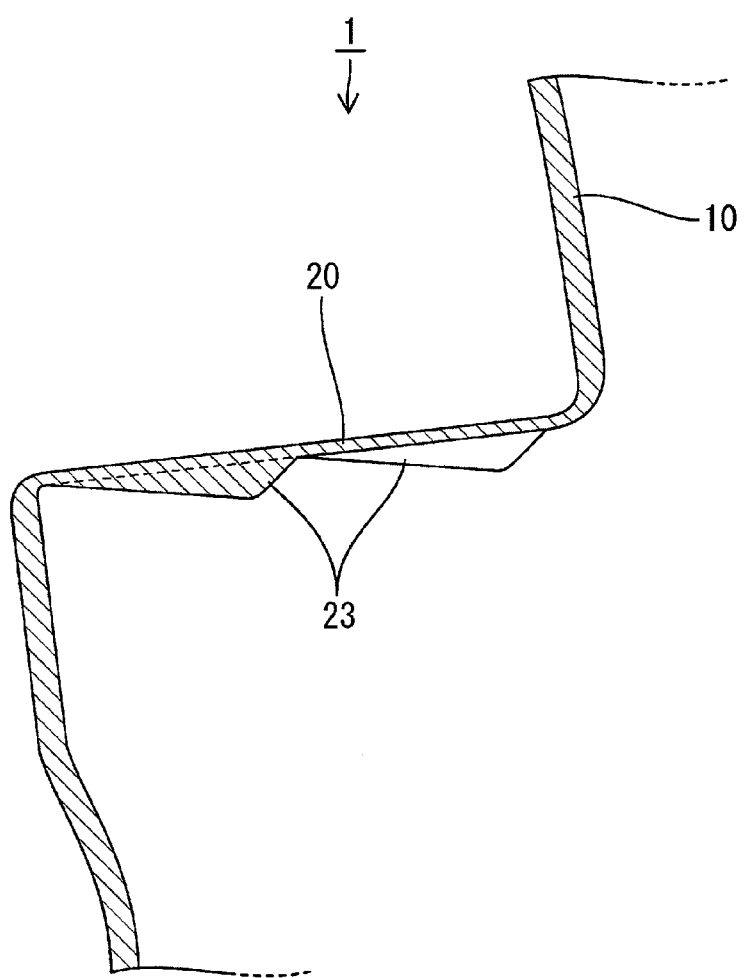
FIG. 2 is a sectional view taken along a line II-II of FIG. 1.
Figure 3:
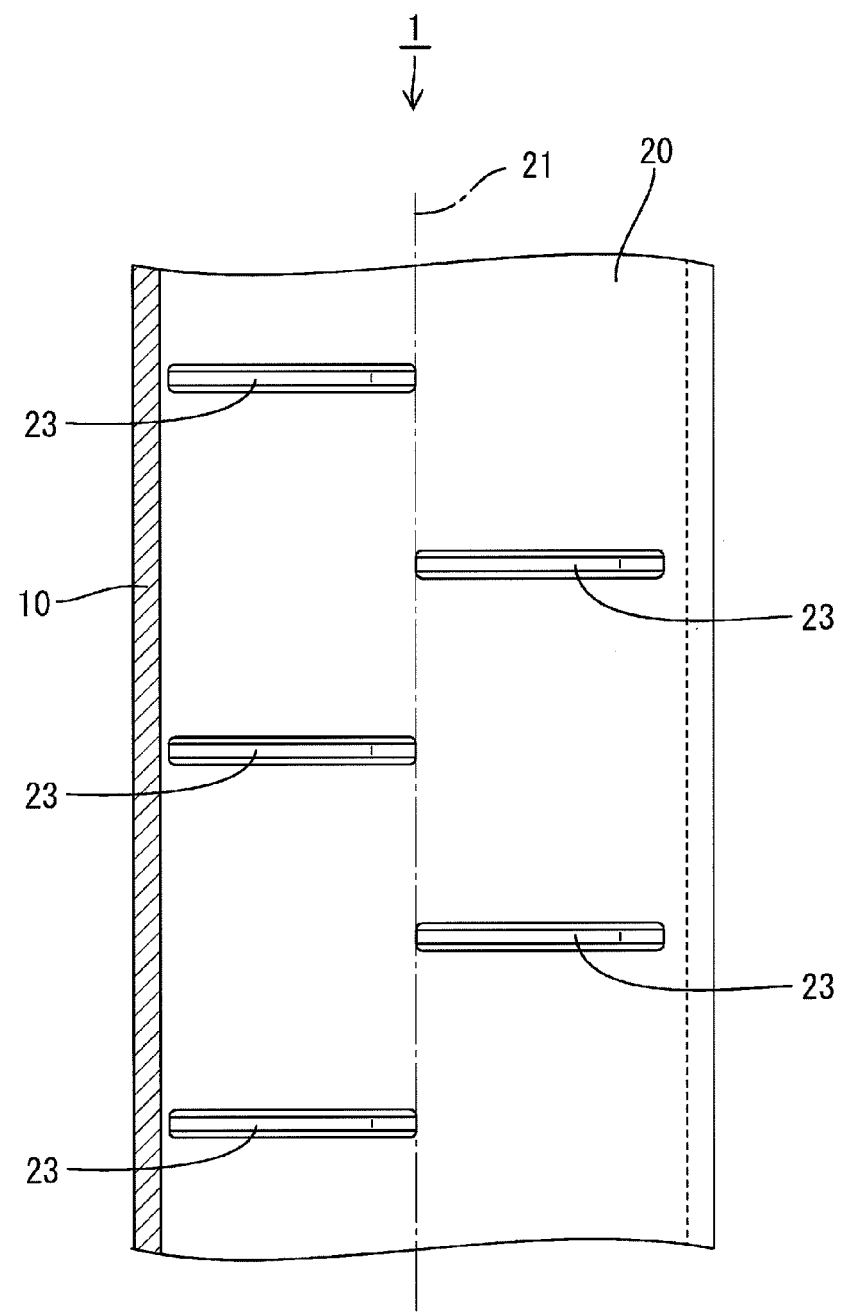
FIG. 3 is a bottom view of an armrest of the first embodiment.
Figure 4:
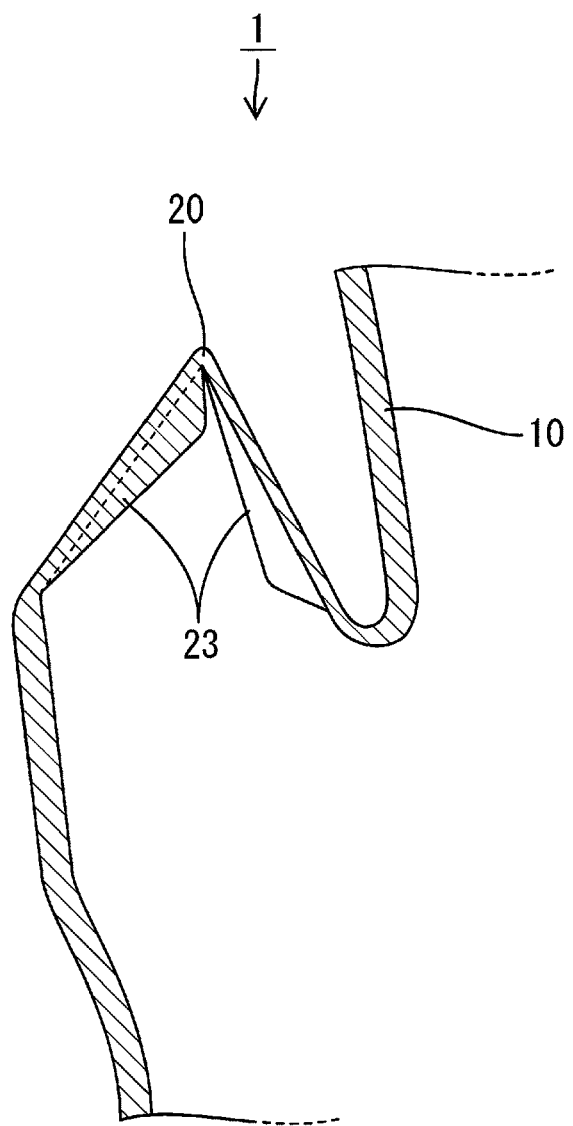
FIG. 4 is a side sectional view showing a state where the armrest of the first embodiment is deformed.

The armrest 20 is provided with a plurality of ribs 23 on an inner surface thereof, as shown in FIGS. 2 and 3. Each of the ribs 23 extends in a transverse direction of the vehicle. The ribs 23 are arranged in a front-back direction of the vehicle and in parallel to each other. Each of the ribs 23 has a substantially triangle shape in a view from a back side of the vehicle as shown in FIG. 2. Each rib 23 has a substantially trapezoidal sectional shape in a view from the transverse direction of the vehicle as shown in FIG. 5. The ribs 23 are integrally formed with the inner surface of the armrest 20. This ensures rigidity of the armrest 20 to bear a weight of an elbow even in the case where the armrest 20 is thinner than the body 10. Therefore, when a person located in the compartment rests the elbow on the outer surface of the armrest 20, the outer surface of the armrest 20 can be prevented from sinking toward the inner surface side.

A break line (a line shown by dashed-dotted line in FIG. 3) 21 is set substantially in the center of the armrest 20 in the transverse direction of the vehicle. The break line 21 extends in the front-back direction of the vehicle. The ribs 23 are arranged at both sides of the break line 21. That is, the inner surface of the armrest 20 has an nearer area that is nearer to the person located in the compartment of the vehicle (hereinafter referred to as the nearer area) and an farther area that is farther from the person (hereinafter referred to as the farther area), and a position of the break line 21 is set between ribs 23 arranged in the nearer area and ribs 23 arranged in the farther area. In addition, the ribs 23 arranged in the nearer area of the inner surface of the armrest 20 and the ribs 23 arranged in the farther area of the same surface are arranged in a manner out of line with each other in the transverse direction of the vehicle.

In the event of side impact to the vehicle, thus, as the door is protruded toward the inside of the vehicle compartment and is deformed, the armrest 20 is pushed against the person and is deformed. This deformation of the armrest 20 then reduces impact to the person. That is, because the armrest 20 is thinner than the body 10 as described above, stress is concentrated on the break line 21 when side impact load is applied. When the armrest 20 is deformed along the break line 21 and in a direction from the outer surface of the armrest 20 toward the inside of the vehicle compartment, the side impact load can be absorbed in the break line 21.

Note that because the foam layer 11 of the armrest 20 is formed with resin foam molding as shown in FIG. 5, the foam layer 11 is easily deformed under the side impact load. Therefore, when the ribs 23 are subjected to impact caused by the side impact to the vehicle, the ribs 23 are released from the armrest 20. As the ribs 23 are released from the armrest 20, the lower one of the skin layers 12, following the ribs 23, peels off from the foam layer 11. As the skin layer 12 peels off from the foam layer 11, the rigidity of the armrest 20 is reduced. As the rigidity of the armrest 20 is reduced, the armrest 20 becomes still more easily deformable. Thus, by the deformation of the armrest 20 facilitated by the peeling off of the skin layer 12 and by the deformation of the armrest 20 along the break line 21, the armrest 20 can still effectively absorb the side impact load.

As described above, in this embodiment, in a normal state other than in the event of side impact to the vehicle, the rigidity of the armrest 20 can be maintained by the ribs 23. Therefore, when the person rests the elbow on the outer surface of the armrest 20, the outer surface of the armrest 20 can be prevented from sinking toward the inner surface side. On the other hand, in the event of side impact to the vehicle, the armrest 20 can be deformed along the break line 21 that is determined by the arrangement of the ribs 23. Furthermore, the armrest 20 can effectively absorb the side impact load by easily releasing the ribs 23 therefrom and thereby reducing the rigidity.

Furthermore, the break line 21 can be set between the ribs 23 arranged in the nearer area of the inner surface of the armrest 20 and the ribs 23 arranged in an farther area of the same surface. Furthermore, the ribs 23 arranged in the nearer area of the inner surface of the armrest 20 and the ribs 23 arranged in the farther area of the same surface are arranged in the manner out of line with each other in the transverse direction of the vehicle. Therefore, the ribs 23 can be arranged in a better balance and, therefore, the rigidity of the armrest 20 can be effectively increased without extremely increasing the number of the ribs 23.

Second Embodiment

Figure 6:
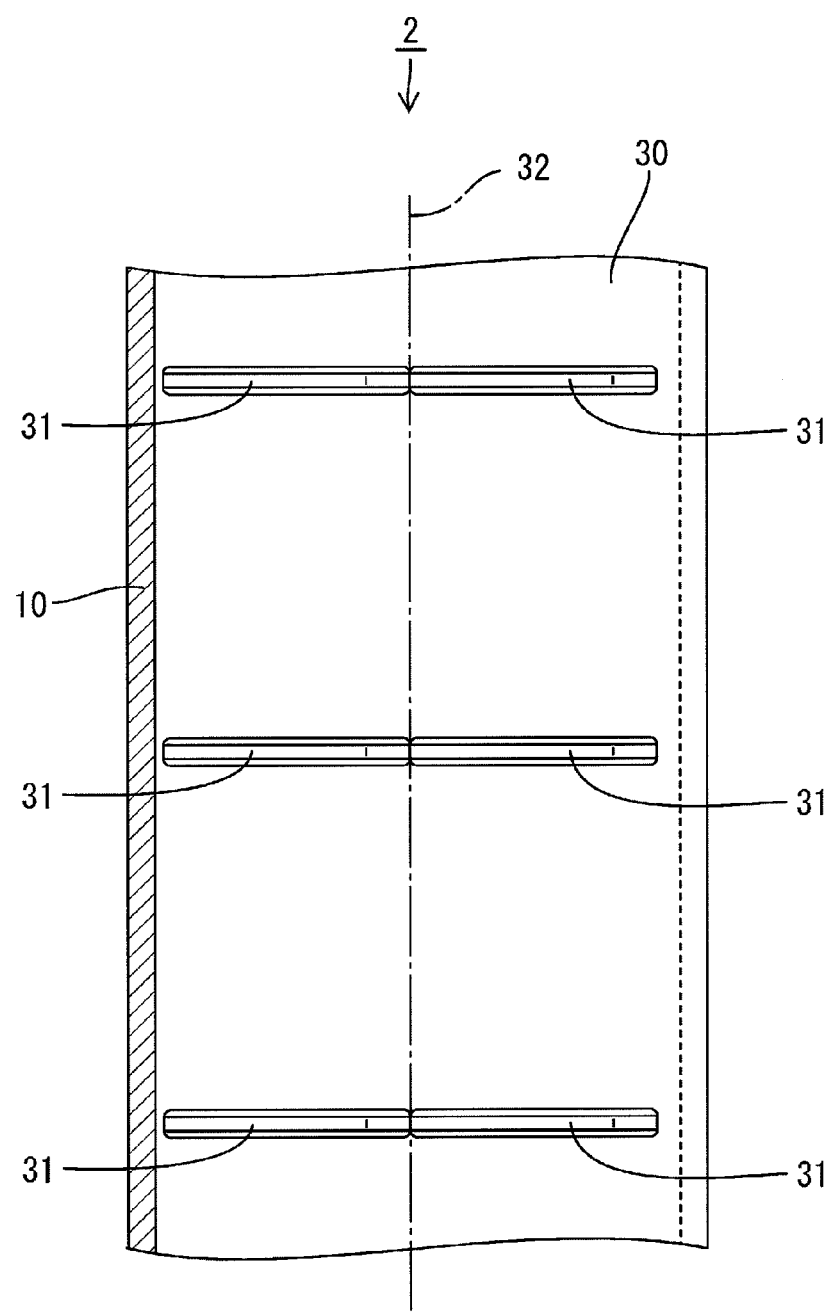
FIG. 6 is a bottom view of an armrest of a second embodiment.

Next, a second embodiment in accordance with the present invention will be described with reference to FIG. 6. A door trim 2 of this embodiment has ribs 31 that differ in arrangement from the ribs 23 of the first embodiment. In this embodiment, configurations identical with the first embodiment are designated by the same numerals, while explanations of configurations, operations, and effects identical with the first embodiment are omitted.

In this embodiment, ribs 31 that are arranged in the nearer area of an inner surface of an armrest 30 and ribs 31 arranged in the farther area of the same surface are arranged in lines in the transverse direction of the vehicle. In other words, ends (first end portions) of the ribs 31 arranged in the nearer area and ends (second end portions) of the ribs 31 arranged in the farther area are arranged in a butting manner.

This serves for easier localization of a break line 32 in the transverse direction of the vehicle. Furthermore, in a case where a still higher rigidity of the armrest 30 is required, the rigidity of the armrest 30 can be properly adjusted by narrowing spaces in the front-back direction of the vehicle between the ribs 31. Therefore, in this embodiment, in the event of side impact to the vehicle, the armrest 30 can be surely deformed between the first ends and the respective second ends.

Third Embodiment

Figure 7:
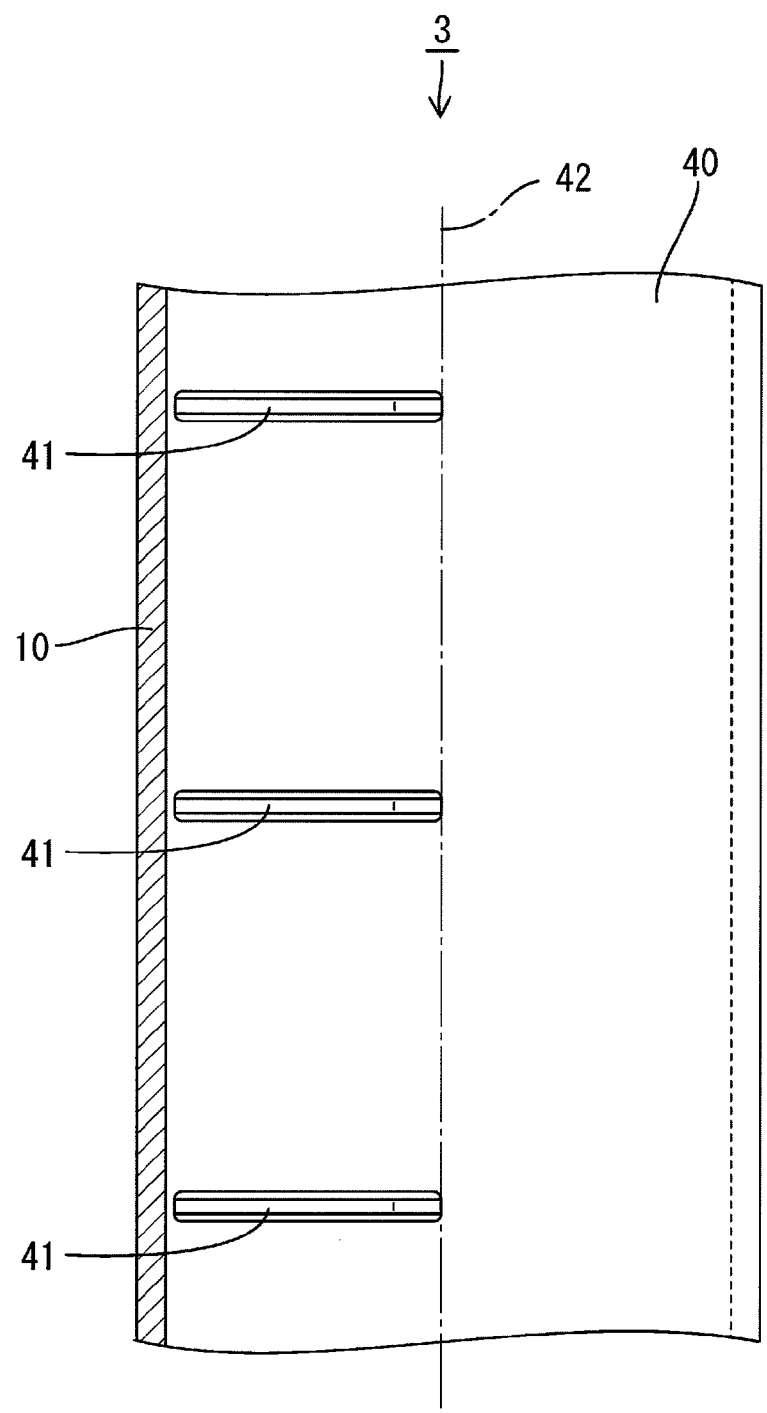
FIG. 7 is a bottom view of an armrest of a third embodiment.

Next, a third embodiment in accordance with the present invention will be described with reference to FIG. 7. A door trim 3 of this embodiment has ribs 41 that differ in arrangement from the ribs 23 of the first embodiment. In this embodiment, configurations identical with the first embodiment are designated by the same numerals, while explanations of configurations, operations, and effects identical with the first embodiment are omitted.

In this embodiment, ribs 41 are arranged only in the nearer area of an inner surface of an armrest 40, while the ribs 41 are not arranged in the farther area of the same surface. This allows for smaller number of the ribs 41 and, furthermore, simpler configurations of the door trim 3. In a case where such configurations as of this embodiment are adopted, each of the ribs 41 has an end (a right end in FIG. 7) that is farther from the person, and a break line 42 is positioned at these farther ends. This is because the rigidity of the armrest 40 drastically differs at the farther ends of the ribs 41.

Furthermore, it is the nearer area of the armrest 40 that tends to suffer the load from the elbow when the person rests the elbow on the armrest 40, and the nearer area of the armrest 40 is set to have a higher rigidity. Therefore, as the load from the elbow can be borne by the nearer area of the armrest 40, an outer surface of the armrest 40 is effectively prevented from sinking toward the inner surface side.

Other Embodiments

The present invention is not limited to the embodiments as above described with reference to the drawings. For example, the following embodiments are also included within the scope of the invention.

(1) In any one of the above embodiments, each of the ribs has a substantially trapezoidal sectional shape. In accordance with the present invention, each rib may have any other sectional shape such as a substantially square sectional shape or a substantially square shape having rounded corners.

(2) In any one of the above embodiments, each of the ribs extends in the transverse direction of the vehicle. In accordance with the present invention, each rib may extend in the front-back direction of the vehicle, provided that the ribs can set the position of the break line.

(3) In any one of the above embodiments, the body 10 includes the skin layers 12. In accordance with the present invention, the body 10 does not necessarily have to include the skin layers 12.

(4) In any one of the above embodiments, the armrest is integrally formed with the body 10. In accordance with the present invention, an armrest may be formed separately from the body 10 and, thereafter, be secured to the body 10.

(5) Any one of the above embodiments is configured such that the break line extends straight in the front-back direction of the vehicle. In accordance with the present invention, it may be configured such that the break line extends in a curved manner and in the front-back direction of the vehicle by properly adjusting the number of the ribs, length and/or shape of each rib, arrangement of the ribs, and/or the like.

What is claimed is:

1. A door trim for use with a vehicle, the vehicle including a compartment and a door panel, the door panel having a wall on the vehicle compartment side thereof, wherein the door trim reduces impact to a person located in the compartment in an event of a side impact to the vehicle, the door trim comprising:

a body configured to be mounted along the wall of the door panel of the vehicle;

an armrest that protrudes in a width direction of the vehicle from the body toward the inside of the vehicle compartment, the armrest including resin foam molding, a cross section of a material thickness of the armrest being thinner than that of the body, the armrest having an outer surface and an inner surface;

a plurality of ribs disposed on the inner surface of the armrest, a longitudinal length of each rib generally extending in the width direction of the vehicle; and a break line set substantially in a center of the armrest, the break line extending substantially in a front-back direction of the vehicle, wherein in an event of a side impact to the vehicle the armrest is configured to substantially deform along the break line and in the width direction of the vehicle, and the plurality of ribs are separately arranged in the front-back direction of the vehicle so as to set a position of the break line.

2. The door trim according to claim 1, wherein the inner surface of the armrest includes a vehicle compartment-side area and a body-side area, the vehicle compartment-side area being nearer to the vehicle compartment than the body-side area, and the plurality of ribs are arranged in the vehicle compartment-side area and in the body-side area.

3. The door trim according to claim 2, wherein the ribs arranged in the vehicle compartment-side area and the ribs arranged in the body-side area are staggered along the front-back direction of the vehicle.

* * * * *